United States Patent Office 3,273,980
Patented Sept. 20, 1966

3,273,980
OPERATION OF FUEL OIL BURNERS
William M. Le Suer and Casper J. Dorer, Jr., Cleveland, Ohio, assignors to The Lubrizol Corporation, Wickliffe, Ohio, a corporation of Ohio
No Drawing. Filed Oct. 22, 1962, Ser. No. 232,292
10 Claims. (Cl. 44—63)

This invention relates to fuel oils and in a more particular sense to fuel oils containing an organic, phosphorus- and nitrogen-containing additive.

Hydrocarbon fuel oils are susceptible to deterioration in storage upon contact with air, moisture, or heat. The products of deterioration tend to form insoluble sludge-like or varnish-like deposits and cause clogging of filters, orifices, and fuel lines. It is thus desirable to incorporate into a fuel oil chemical additives which are capable of inhibiting deterioration of the oil or dispersing the deterioration products in the oil phase so as to prevent the formation of harmful deposits.

An additional difficulty is encountered in the use of fuel oils obtained by the distillation or cracking of petroleum fractions. Such oils usually contain a small amount of acidic contaminants, such as naphthenic acids, which are formed as by-products of petroleum. They contain also malodorous contaminants such as hydrogen sulfide, mercaptans, and other sulfur-containing substances. To improve the odor, the oils are treated with an alkali or alkaline earth metal plumbite solution which removes the objectionable odor of the sulfur-containing contaminants. In this method of purification, the acidic contaminants likewise react with the alkali to form insoluble, soap-like substances. In the operation of a furnace burner or engine the soap-like substances tend to accumulate on the filter screens and near the orifices and eventually cause the clogging of these parts.

Other instances of the formation of the insoluble, soap-like contaminants are found in the transportation of fuel oil by sea-going vessels. It is customary for such vessels, on return trips, to carry a sufficient quantity of sea water as the ballast in the same compartments which hold the fuel oil on the out-going trips. Thus, in the next shipment, the fuel oil comes into contact with the residual sea water which has not been completely removed from the vessel. Also, it is sometimes necessary to carry the oil and some sea water in the same tanks to maintain proper weight distribution. In either situation, the salts in the sea water react with the acidic contaminants of the fuel oil to form the insoluble, soap-like substances.

It is an object of this invention to provide fuel oil additives which are capable of preventing the clogging of the burner or engine parts by the soap-like contaminants present in the fuel oil.

It is an object of this invention to provide novel compositions of matter.

It is also an object of this invention to provide improved fuel oil compositions.

It is also an object of this invention to provide fuel oil compositions having improved dispersant properties.

It is also an object of this invention to provide fuel oil compositions having a reduced tendency to form harmful deposits.

These and other objects are attained in accordance with this invention by providing a fuel oil composition comprising a hydrocarbon fuel oil containing a small amount, effective to reduce the tendency of said fuel oil to form deposits, of a salt of (A) a basic amino reactant selected from the class consisting of ammonia, aliphatic amines, aromatic amines, heterocyclic amine, and partially acrylated polyamines obtained by the reaction at a temperature above about 100° C. of an alkylene amine with an aliphatic carboxylic acid having at least about 12 carbon atoms with (B) an acidic phosphorus-containing reactant prepared by the process comprising the reaction of phosphorus pentoxide with from about 2 to about 4 moles of a hydroxy compound selected from the class consisting of olefin polymer-substituted phenols wherein the olefin polymer substituent has a molecular weight of at least about 250 and the condensation products of said phenols with an epoxide.

The fuel oils suitable for use in a burner or engine include the hydrocarbon oils such as distillate and residual burner oils and diesel fuels having the folowing characteristics: minimum flash point, 80° F.; maximum pour point, 70° F.; maximum 10% point, 650° F.; maximum 90% point, 900° F.; minimum API gravity, 24; and maximum viscosity at 100° F., 130 SUS (Saybolt Universal seconds). They may be derived from petroleum by a variety of methods including the straight distillation from crude petroleum oil and thermal or catalytic cracking of petroleum oil fractions.

As indicated above, the basic amino compound of (A) may be ammonia, an aliphatic amine, an aromatic amine, a heterocyclic amine, or a partially acylated polyamine. The amines useful as this reactant may be primary, secondary, or tertiary amines. They may be polyamines such as alkylene and arylene amines including, for example, ethylene diamine, propylene diamine, trimethylene diamine, tetramethylene diamine, hexamethylene diamine, 1,2-butylene diamine, 2,3-butylene diamine, p-phenylene diamine, N,N'-di-methyl phenylene diamine, triethylene tetramine, tetramethylene pentamine, octamethylene diamine, pentaethylene hexamine, di(trimethylene) triamine, N-ethyl ethylene diamine, N,N-dimethyl propylene diamine, N-octadecyl phenylene diamine, N,N,N',N'-tetrapentyl o-phenylene diamine, N-octadecyl ethylene diamine, and higher homologues thereof. The alkylene amines may also be cyclic amines such as piperazine, 1-(2-aminoethyl) piperazine, 2-methyl-1-(2-aminobutyl) piperazine, 2-heptyl-3-(2-aminopropyl) imidazoline, 4-methyl-imidazoline, 1,3-bis(2-aminoethyl) imidazoline, pyrimidine, 1,4-bis(2-aminoethyl) piperazine, etc. The alkylene amines usually have from about 1 to about 10 carbon atoms and preferably from 2 to 4 carbon atoms in each alkylene ardical.

Mono-amines having from 1 to about 30 carbon atoms are especially useful as this reactant. They include, for example, methylamine, N-methylethylamine, N-methyl octylamine, N-cyclohexyl dodecylamine, dibutylamine, dimethylamine, trimethylamine, cyclohexylamine, behenylamine, docosylamine, octadecylamine, tricyclohexylamine, dicyclopentylamine, triacontanylamine, aniline, N-methyl aniline, p-toluidine, beta-naphthylamine, N,N-dibutylaniline, alpha-phenyl-beta-naphthylamine, furfurylamine, diphenylamine, pyridine, morpholine, picoline, piperidine, pyrrole, pyrroline, pyrrolidine, and the like.

The partially acylated polyamines useful as this reactant are those derived by the reaction of an alkylene amine such as is illustrated above with an aliphatic carboxylic acid having at least about 12 carbon atoms per molecule or a mixture of such aliphatic carboxylic acids. They are partially acylated, i.e., at least one amino group of the alkylene amine is free of the acyl substituent. The term "acyl" is used generically to describe the radical derived from the aliphatic carboxylic acid which froms with an amino group of the alkylene amine, a linkage representative of amide, imide, or an amidine. In the case of a partially acylated alkylene amine having two or more amino groups attached to acyl radicals, it may contain a mixture of the above-noted linkages within its molecular structure. The suitable aliphatic carboxylic acids from which the partially acylated polyamines are derived include for the most part, mono-carboxylic acids having at least about 12 carbon atoms, preferably more than 16 but no more than about 30 aliphatic carbon atoms. They may be saturated or unsaturated acids. Examples of such acids are dodecanoic acid, palmitic acid, oleic acid, stearic acid, linoleic acid, linolenic acid, naphthenic acid, chlorostearic acid, dichlorostearic acid, and commercially available acids such as are obtained by the hydrolysis of tall oil, sperm oil, etc. The acids having from about 16 to about 24 carbon atoms are preferred. They include, for example, naphthenic acid having a molecular weight of 200-400, oleic acid, stearic acid, and tall oil acid.

The formation of a partially acylated polyamine having amide, imide, or amidine linkages including both linear and cyclic amidine linkages such as are found in imidazolines may be illustrated by the reaction of octadecanoic acid with diethylene triamine and represented by the following equations:

(A)
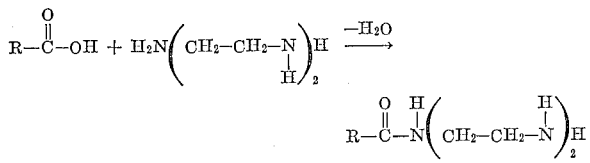

(B)
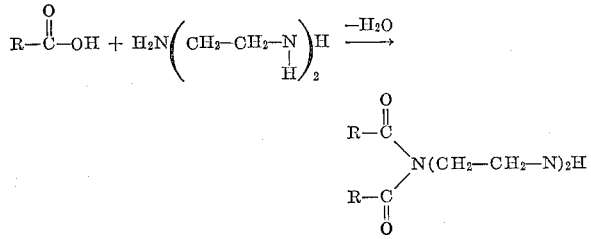

(C)
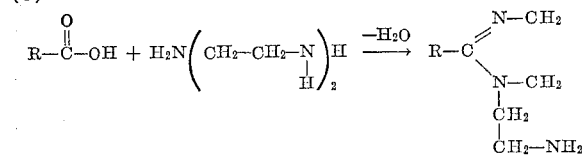

(D)
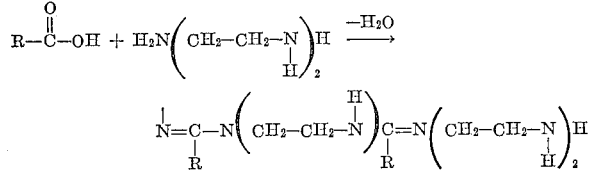

wherein R is a heptadecyl radical.

The reaction of the acid and the alkylene amine may be carried out by mixing the reactants at a temperature from about 100° C. up to the decomposition temperature of the reaction mixture. The presence of a solvent in the reaction is often advantageous to facilitate mixing and temperature control. The solvent may be hydrocarbon or an inert polar solvent. It is illustrated by benzene, toluene, xylene, naphtha, n-hexane, cyclohexane, dodecane, octane, chlorobenzene, ethylene dichloride, dioxane, ether, chloroform, carbon tetrachloride, nitrobenzene, or mineral oil.

The temperature at which the reaction is carried out depends primarily upon the nature of the reactants used and the product desired. In general, a temperature above 100° C. is used to produce partially acylated polyamines having predominantly amide or imide linkages. Also, a relatively high temperature, usually above about 150° C., is preferred to give amidine or imidazoline products which are especially useful as the reactant (A) of this invention.

The relative proportions of the carboxylic acid and the alkylene amine depend upon the number of the nitrogen atoms in the amine reactant, the type of the linkages desired in the partially acylated polyamine product, and the stoichiometry of formation of such linkages. As indicated previously, the partially acylated alkylene amines should contain at least one free amino group. Thus, where an alkylene amine has $n$ number of amino groups per molecule, the amount of the acid reactant to be used usually will be $(n-1)$ equivalents for each mole of the alkylene amine used. The preferred amount of the acid is such as to be sufficient to acylate about one-half of the total amino groups in an alkylene amine. It will be noted, however, that the stoichiometry of the formation of an amidine linkage requires two amino groups for each acyl radical. Accordingly, the amount of the acid reactant may be as low as one equivalent for each two moles of the alkylene amine to form products having predominantly amidine linkages. On the other hand, the stoichiometry of the formation of an imide linkage requires two acyl radicals for one amino group. To form products having predominantly imide linkages, the amount of the acid reactant, therefore, may be as high as two equivalents for each equivalent of the alkylene amine used. It will be noted that the equivalent weight of the acid is based upon the number of the carboxylic acid radicals in the molecule and that of the polyamine is based upon the number of amino radicals in the molecule. To illustrate, a monocarboxylic acid has one equivalent per mole; ethylene diamine has two equivalents per mole; and tetraethylene pentamine has five equivalents per mole.

Also useful as the reactant of (A) is the reaction product obtained by the partially acylated polyamine with a small amount, i.e., up to about 5% (by weight), preferably from about 1% to about 3%, of a lower aliphatic epoxide. The suitable epoxides include, for example, ethylene oxide, propylene oxide, 1,2-butylene oxide, 2,3-pentylene oxide, epichlorohydrin, and other lower aliphatic epoxides having less than about 8 carbon atoms. The treatment of the partially acylated polyamine with the epoxide is usually carried out at a temperature from about 120° C. to about 250° C. A higher temperature, up to the decomposition point of the reaction mixture, may be used. The treatment is preferably effected by introducing small increments of the epoxide to the partially acylated polyamine. The composition of the product of such treatment is not fully understood. It is believed, however, that the product contains substantially a hydroxyalkylated derivative of the partially acylated polyamine.

The acidic phosphorus-containing reactant of (B) useful to prepare the additives in the fuel oil compositions of this invention are obtained by the reaction of phosphorus pentoxide with the above-noted hydroxy compound, i.e., an olefin polymer-substituted phenol or a condensation product of such phenol with an epoxide. Phosphoric acid may be used in lieu of the pentoxide. The molar ratio of the hydroxy compound to the phosphorus pentoxide in the reaction should be within the range from about 2:1 to 4:1, the preferred ratio being 3:1. The reaction is effected simply by mixing the two reactants at a temperature between about 50° C. and 90° C. In some instances, the temperature may be 150° C. or higher but ordinarily it is below 100° C. The reaction is preferably carried out in the presence of a solvent which facilitates temperature control and mixing of the reactants. The solvent may be any inert fluent substance in which either one or both reactants are soluble or the product is soluble. It is illustrated by an aryl hydrocarbon such as benzene, toluene, or xylene; an aliphatic hydrocarbon such as n-hexane, cyclohexane, or naphtha; or a polar solvent such as diethyl ether, Carbitol, dibutyl ether, dioxane, chlorobenzene, nitrobenzene, carbon tetrachloride, or chloroform.

The product of the above reaction is acidic. Its chemical constitution is not precisely known. Evidence indicates, however, that it is a mixture of acidic phosphates consisting predominantly of the mono- and the di-esters of phosphoric acid, the ester radical being derived from the hydroxy compound.

An important aspect of the acidic phosphorus-containing reactant is the chemical constitution of the olefin polymer substituent of the hydroxy compound from which it is derived. Thus, the substituent must have a molecular weight of at least about 250. For economic reasons, it preferably has a molecular weight less than about 5000, although substituents having molecular weights as high as 100,000 or even higher likewise are useful.

The sources of the substituent include principally the substantially saturated polymers of mono-olefins having from 2 to about 8 carbon atoms. The especially useful polymers are the polymers of 1-mono-olefins such as ethylene, propene, 1-butene, isobutene, and 1-hexene. Polymers of medial olefins, i.e., olefins in which the olefinic linkage is not at the terminal position, likewise are useful. They are illustrated by 2-butene, 3-pentene, and 4-octene.

Also useful are the interpolymers of the olefins such as those illustrated above with other interpolymerizable olefinic substances such as aromatic olefins, cyclic olefins, and polyolefins. Such interpolymers include, for example, those prepared by polymerizing isobutene with styrene; isobutene with butadiene; propene with isoprene; ethylene with piperylene; isobutene with chloroprene; isobutene with p-methyl styrene; 1-hexene with 1,3-hexadiene; 1-octene with 1-hexene; 1-heptene with 1-pentene, 3-methyl-1-butene with 1-octene; 3,3-dimethyl-1-pentene with 1-hexene; isobutene with styrene and piperylene; etc.

The relative proportions of the mono-olefins to the other monomers in the interpolymers influence the stability and oil-solubility of the final additive compositions derived from such interpolymers. Thus, for reasons of oil-solubility and stability the interpolymers should be substantially aliphatic and substantially saturated, i.e., they should contain about 80%, preferably at least about 95%, on a weight basis of units derived from the aliphatic mono-olefins and no more than about 5% of olefinic linkages based on the total number of carbon-to-carbon covalent linkages. In most instances, the percentage of olefinic linkages should be less than about 2% of the total number of carbon-to-carbon covalent linkages.

Specific examples of such interpolymers include copolymers of 95% (by weight) of isobutene with 5% of styrene; terpolymer of 98% of isobutene with 1% of piperylene and 1% of chloroprene; terpolymer of 95% of isobutene with 2% of 1-butene and 3% of 1-hexene; terpolymer of 60% of isobutene with 20% of 1-pentene and 20% of 1-octene; copolymer of 80% of 1-hexene and 20% of 1-heptene; terpolymer of 90% of isobutene with 2% of cyclohexene and 8% of propene; and copolymer of 80% of ethylene and 20% of propene.

The olefin polymer-substituted phenols may be the mono- or the poly-substituted phenols, i.e., phenols having two or more olefin polymer substituents. A convenient method for preparing the substituted phenols comprises the alkylation of phenol with the olefin polymer in the presence of a Friedel-Crafts catalyst such as boron fluoride, aluminum chloride, aluminum bromide, ferric chloride, zinc chloride, diatomaceous earth, or the like. In lieu of the olefin polymer, a halogenated olefin polymer may be used to alkylate the phenol. In the latter method the olefin polymer may be first chlorinated to a product having one or more atomic proportions of chlorine per molecule of the olefin polymer and the chlorinated olefin polymer is then allowed to react with the phenol in the presence of a Friedel-Crafts catalyst. More than one mole of the olefin polymer may be made to react with phenol so that the product may contain two or three olefin polymer substitutents. The preparation of the substituted phenols by these and other methods is well-known in the art and need not be described here in greater detail.

As previously indicated, the condensation products of the above-described olefin polymer-substituted phenols with epoxides likewise are useful to produce the acidic phosphorus-containing reactant of this invention. The epoxides are for the most part alkylene oxides or arylalkylene oxides. The arylalkylene oxides are exemplified by styrene oxide, p-ethylstyrene oxide, alpha-methylstyrene oxide, 3-beta-naphthyl-1,3-butylene oxide, n-dodecylstyrene oxide, and p-chlorostyrene oxide. The alkylene oxides include principally the lower alkylene oxides, i.e., those having 8 or less carbon atoms in the alkylene radical. Examples of such lower alkylene oxides are ethylene oxide, propylene oxide, 1,2-butene oxide, trimethylene oxide, tetramethylene oxide, butadiene monoepoxide, 1,2-hexene oxide, and 2,3-butene oxide. Higher alkylene oxides are illustrated by 1,2-decene oxide, epoxidized terpolymer of 95 parts (by weight) of isobutene with 3 parts of butadiene and 2 parts of styrene (having a molecular weight of 2000), epoxidized heptadecene, and epoxidized copolymer of 90 parts of isobutene with 10 parts of isoprene having a molecular weight of 5000. The epoxides may contain a polar-substituent, usually a halo radical such as chloro, fluoro, bromo, or iodo; an ether radical such as methoxy, decyloxy, or phenoxy; or an ester radical such as carbomethoxy, or carbobutoxy radical. Examples of such epoxides are epichlorohydrin, butyl-9,10-epoxystearate, epoxidized soybean oil, and epoxidized tung oil.

The methods whereby the condensation products of phenols with epoxides are obtained likewise are known in the art. A commonly used method involves simply mixing a phenol with an epoxide in the presence of a small amount of a basic catalyst under atmospheric or super atmospheric pressures. The basic catalyst may be an alkali or alkaline earth metal hydroxide such as sodium hydroxide or potassium hydroxide; an alkali or alkaline earth metal alcoholate such as sodium ethoxide or barium methoxide; or an alkali or alkaline earth metal phenate such as potassium phenate or calcium octylphenate. It may be the alkali or alkaline earth metal phenate of the olefin polymer-substituted phenol from which the condensation products with an epoxide are derived. In the latter instance the catalyst may be formed in the condensation mixture by adding the elemental metal to the phenol reactant. Only a very small amount of the catalyst is sufficient to cause the condensation of the phenols with the epoxides. It can be as low as 0.01% by weight of the phenol, although in most instances it is within the range from about 0.5% to 2%.

The temperature at which the condensation is carried out may be varied within wide ranges such as from room temperature to 250° C. Ordinarily it is 50°–150° C. More than one mole of the epoxide may condense with the phenol so that the product may contain one or more of the radicals derived from the epoxide. For the purposes of this invention, the condensation products derived from about 3 to about 10 moles of an epoxide per mole of the phenol are especially effective and therefore preferred.

An alternative method for preparing the condensation products involves first converting the phenol to a phenate of an alkali or an alkaline earth metal and mixing the phenate with the desired proportions of the epoxide. This method likewise permits the condensation of more than one mole of the epoxide with the phenol.

The salt which is useful as the additive in the fuel oil composition of this invention can be prepared simply by mixing the amino reactant of (A) and the acidic phosphorus-containing reactant of (B) at a temperature below about 100° C. The reaction in most instances is slightly exothermic and is preferably carried out in the presence of a solvent. The solvent suitable for use in the reaction may be a hydrocarbon or a polar solvent such as benzene, naphtha, toluene, xylene, n-hexane, dioxane, chlorobenzene, kerosene, naphtha, or a fuel oil. Ordinarily the relative proportions of the reactants used to prepare the salt are one equivalent of the acidic phosphorus-containing reactant and one equivalent of the amino reactant so that in the case where a polyamine is used as a reactant, all of the free amino groups may be converted to salts by reaction with the acidic phosphorus-containing reactant. In some instances, however, only one of the amino groups of the polyamine reactant may be utilized to form a salt. Thus, for instance, if diethylene triamine is used as the reactant, the amount of acidic phosphorus-containing reactant to be used may vary from 1 equivalent to 3 equivalents per mole of the amine reactant so that one, two, or all three of the amino groups of the triamine may be converted to salts. It will be noted that where a partially acylated polyamine is used as the reactant, only the free amino groups, i.e., those not containing an acyl substituent, are capable of forming a salt. In this situation the amount of the acidic phosphorus-containing reactant to be used is based upon the number of such free amino groups in the partially acylated polyamine reactant.

EXAMPLE 1

A partially acylated polyamine reactant of (A) is prepared as follows: a mixture (565 parts by weight) of an alkylene amine mixture consisting of triethylene tetramine and diethylene triamine in weight ratio of 3:1 is added at 20°–80° C. to a mixture of equivalent amounts of a naphthenic acid having an acid number of 180 (1270 parts) and oleic acid (1110 parts; the total quantity of the two acids used is such as to provide one equivalent for each two equivalents of the amine mixture used). The reaction is exothermic. The mixture is blown with nitrogen while it is being heated to 240° C. in 4.5 hours and thereafter heated at this temperature for 2 hours. Water is collected as the distillate. To the above residue ethylene oxide (140 parts) is added at 170°-180° C. within a period of 2 hours while nitrogen is bubbled through the reaction mixture. The reaction mixture then is blown with nitrogen for 15 minutes and diluted with 940 parts of xylene to a solution containing 25% of xylene. The resulting solution has a nitrogen content of 5.4% and a base number of 82 at pH of 4, the latter being indicative of free amino groups.

EXAMPLE 2

A partially acylated polyamine of (A) is prepared by heating a xylene solution of an equimolar mixture of ethylene diamine and oleic acid at 180° C. and removing the water formed. The product consists essentially of the mono-oleamide of ethylene diamine (i.e., N-aminoethyl oleamide).

EXAMPLE 3

A partially acylated polyamine of (A) is obtained by heating a xylene solution of an equimolar mixture of tall oil acid having an acid number of 250 and tetraethylene pentamine at 225° C. until all of the water formed during the reaction is distilled off. The product consists essentially of an imidazoline. The imidazoline obtained is then treated with 2% by weight of propylene oxide at 150° C.

EXAMPLE 4

An acidic phosphorus-containing reactant of (B) is prepared as follows: A polyisobutene-substituted phenol is prepared by mixing 940 parts (by weight) of phenol and 2200 parts of polyisobutene having a molecular weight of 350 at 50°–55° C. in the presence of 30 parts of boron trifluoride, and distilling off the unused phenol and other volatile substances by heating the alkylated phenol to 220° C./12 mm. The resulting alkylated phenol has a hydroxyl content of 3.7%. A mixture of 490 parts of the alkylated phenol, 50 parts of phosphorus pentoxide, and 180 parts of xylene (molar ratio of the phenol to phosphorus pentoxide being 3:1) is prepared at 38°–50° C. and thereafter heated at 80°–85° C. for 4 hours. The resulting mixture is filtered and the filtrate is a xylene solution of the acidic, phosphorus-containing product having a phosphorus content of 3.1% and an acid number of 76.

EXAMPLE 5

An acidic, phosphorus-containing reactant of (B) is prepared according to the procedure of Example 4 except that the polyisobutene substituent of the phenol reactant has a molecular weight of 1000.

EXAMPLE 6

An acidic, phosphorus-containing reactant of (B) is prepared according to the procedure of Example 4 except that the phenol reactant is a di-(polyisobutene)-substituted phenol in which each polyisobutene substituent has a molecular weight of 500.

EXAMPLE 7

An acidic, phosphorus-containing reactant of (B) is prepared according to the procedure of Example 4 except that 4 moles of the phenol reactant is used for each mole of the phosphorus pentoxide.

EXAMPLE 8

An acidic, phosphorus-containing reactant of (B) is prepared according to the procedure of Example 4 except that 4 moles of the phenol reactant is used for each mole of the phosphorus pentoxide used.

EXAMPLE 9

An acidic, phosphorus-containing reactant of (B) is prepared according to the procedure of Example 4 except that the phenol reactant is a polyisobutene-substituted naphthol wherein the polyisobutene substituent has a molecular weight of 350.

EXAMPLE 10

An acidic, phosphorus-containing reactant of (B) is prepared according to the procedure of Example 4 except that the phenol reactant is a polypropene-substituted phenol wherein the polypropene substituent has a molecular weight of 2000.

EXAMPLE 11

An acidic, phosphorus-containing reactant of (B) is prepared according to the procedure of Example 4 except that the phenol reactant is a mono-substituted phenol in which the substituent is derived from a copolymer of 95 parts of isobutene with 5 parts of styrene having a molecular weight of 1000.

EXAMPLE 12

A condenation product of polyisobutene (molecular weight of 350)-substituted phenol and ethylene oxide is obtained by introducing ethylene oxide into the phenol containing 0.13% by weight of sodium hydroxide as the catalyst at 150°–185° C. until the product has a molar ratio of ethylene oxide to phenol of 8.12:1. The product is then blown with nitrogen, dissolved in benzene, and the solution washed with water, dried, and then heated to free the benzene. A mixture of 160 grams (0.21 mole based upon the hydroxyl content of 2.3%) of this product and 9.1 grams (0.064 mole) of phosphorus pentoxide is heated at 50°–60° C. for 3 hours and the resulting product filtered. The filtrate is an acidic, phosphorus-containing reactant of (B) having a phosphorus content of 2% and an acid number of 57.

EXAMPLE 13

A salt is prepared by mixing at 25°–45° C. 250 grams (0.35 equivalent) of a xylene solution containing 70% of the partially acylated polyamine prepared according to the procedure of Example 1 and 8% of a commercial metal de-activator and a de-emulsifier and 259 grams (0.35 equivalent) of the xylene solution of the acidic, phosphorus-containing product of Example 4. An exothermic reaction occurs. The mixture is heated at 90°–100° C. for 2 hours and mixed with 9 grams of xylene. The resulting solution is found to have a nitrogen content of 2.6% and a phosphorus content of 1.6%.

EXAMPLE 14

A salt is prepared by mixing at 25°–60° 474 grams (0.64 equivalent) of the xylene solution of the acidic, phosphorus-containing product of Example 4 and 123 grams (0.64 equivalent) of a commercial aliphatic primary amine having an average molecular weight of 190 in which the aliphatic radical is a mixture of tertiary-alkyl radicals containing from 11 to 14 carbon atoms. An exothermic reaction occurs. The mixture is heated at 90°–97° C. for 2 hours. The resulting product has a nitrogen content of 1.5% and a phosphorus content of 2.3%.

EXAMPLE 15

A salt is prepared by bubbling ammonia into the xylene solution of the acidic, phosphorus-containing product of Example 4 at 20°–60° C. until no more ammonia is absorbed by the reaction mixture. The product is the ammonium salt of the acidic, phosphorus-containing product. It is blown with nitrogen for 2 hours and the residue is found to have a nitrogen content of 1.9% and a phosphorus content of 2.9%.

EXAMPLE 16

A salt is prepared by a procedure similar to that described in Example 14 except that the aliphatic amine is replaced on a chemical equivalent basis with trimethyl amine.

EXAMPLE 17

A salt is obtained by a procedure similar to that described in Example 14 except that the aliphatic amine is replaced on a chemical equivalent basis with dicyclohexyl amine.

EXAMPLE 18

A salt is obtained by a procedure similar to that described in Example 14 except that the aliphatic amine is replaced on a chemical equivalent basis with N-octadecyl trimethylene diamine.

EXAMPLE 19

A salt is obtained by a procedure similar to that described in Example 14 except that the aliphatic amine is replaced on a chemical equivalent basis with behenyl amine.

EXAMPLE 20

A salt is obtained by a procedure similar to that described in Example 14 except that the aliphatic amine is replaced on a chemical equivalent basis (free amino group) of the oleamide of Example 2.

EXAMPLE 21

A salt is obtained by a procedure similar to that described in Example 13 except that the acidic, phosphorus-containing reactant is replaced on a chemical equivalent basis with the product of Example 12.

EXAMPLE 22

A salt is obtained by mixing at 60°–70° C. one mole of tetraethylene pentamine with one equivalent of the xylene solution of acidic, phosphorus-containing reactant obtained by the procedure of Example 4.

The salts of the amino reactant of (A) with the acidic, phosphorus-containing reactant of (B) are oil-soluble and may be incorporated into a fuel oil simply by mixing them with the oil at the desired concentration. Alternatively, they may be dissolved first in a fluid, combustible solvent, particularly a hydrocarbon solvent having a boiling point below about 250° C. such as naphtha, benzene, xylene, n-hexane, gasoline, or fuel oil to obtain a fluid concentrate and the concentrate may then be diluted with additional quantities of the oil to obtain the final fuel oil composition. In many instances, it is convenient to form the salt in the final fuel oil composition by adding the amino and the acidic, phosphorus-containing reactants to the final fuel oil composition at suitable concentrations. The concentration of the salts in a final fuel oil composition usually ranges from about 0.0001% to 1% by weight. The preferred concentration is about 0.005–0.1%. A higher concentration than 1% may be used but is ordinarily unnecessary.

An important utility of the salts of this invention is in fuel oils which are contaminated with insoluble, soap-like substances formed between acidic impurities such as naphthenic acids and a metal such as sodium, potassium, magnesium, or calcium. Thus, it has been found that the addition of a small amount of the salts to a fuel oil having such contaminants prevents the clogging of filters, small orifices, and other parts of the burner or engine in which the fuel oil is used.

This effectiveness of the salts is shown by the following fuel oil anti-clogging test. In this test, a filter (1.2-micron porosity) is "clogged" by passing through it a fuel oil containing a small amount of the sodium salt of naphthenic acid (prepared by treating the oil containing 0.025% by weight of naphthenic acid with aqueous sodium hydroxide) and allowing the insoluble sodium salt to accumulate on the filter until the flow rate of the oil is reduced to approximately 2 ml./minute from an initial rate of approximately 8 ml./minute. Thereafter, a fuel oil containing the salt additive is allowed to pass through the "clogged" filter and its flow rate is recorded. For purposes of comparison, a fuel oil containing no additive is likewise allowed to pass through a similarly "clogged" filter and its flow rate is also recorded. In this particular test (results reported in Table I below), the fuel oil used is kerosene and the flow rates are taken at intervals of 25 ml. of filtrate.

*Table I*

[Flow rates, ml./minute]

| Milliliters of Filtrate at Which Flow Rate is Reported | Fuel Oil Containing— | | | | |
|---|---|---|---|---|---|
| | No Additive | 0.0025% of Product of Example 13 | 0.01% of Product of Example 13 | 0.01% of Product of Example 14 | 0.0075% of Product of Example 15 | 0.01% of Product of Example 15 |
| Initial | 1.9 | 0.8 | 0.5 | 2 | 1.5 | 1 |
| 50 | 3 | 2.3 | 4 | 10.5 | 4.5 | 4.5 |
| 100 | 3.2 | 7.5 | 8 | 18 | 13 | 12 |
| 150 | 3.2 | 17 | 11.5 | 22 | 16 | 18 |
| 200 | 3.2 | 18 | 14 | 24 | 17 | 21.5 |
| 250 | 3.2 | 18 | 15.5 | 25 | 18.5 | 23 |
| 300 | 3.2 | 18 | 17 | 25 | 19 | 24.5 |
| 350 | 3.2 | 18 | 18 | 25 | 19 | 25 |
| 400 | 3.2 | 18 | 18.5 | 25 | 19 | 25 |
| 450 | | 18 | 19 | 25 | 19 | 25 |
| 500 | | | 19.5 | | 19 | 25 |
| 550 | | | 19.5 | | 19 | 25 |

The effectiveness of the salt additive of this invention to inhibit the tendency of fuel oils to form sludge is shown by the results of the fuel oil detergent test (Table II). In this test, a mixture of 4 liters of a catalytically cracked No. 2 light fuel oil and 15 grams of a synthetic sludge (prepared by homogenizing a 50/40/10, by weight, mixture of distilled water/fuel oil/carbon black) is circulated for 2 hours in a fuel oil burner pump (Model J3BC-100-3) equipped with a 100-mesh Monel strainer. The sludge retained on the strainer is washed with acetone and weighed. The effectiveness of the additive is indicated by the percent reduction of the sludge retained on the strainer as compared to the sludge formed from the fuel oil containing no additive.

Table II

| Sample Tested | Sludge Milligrams | Percent Reduction |
|---|---|---|
| Fuel oil | 543–603 | |
| Fuel oil + 0.01% by weight of the Product of Example 13 | 6 | 99 |
| Fuel oil + 0.01% by weight of the Product of Example 14 | 238 | 56 |
| Fuel oil + 0.01% by weight of the Product of Example 15 | 6 | 99 |

The salt additives of this invention are also effective to improve the stability of fuel oils under storage and service conditions. This effectiveness is demonstrated by a fuel oil stability test which involves blowing a 350-ml. sample of a filtered No. 2 fuel oil having an ASTM color rating of 1–1.5 in a glass tube with oxygen at a rate of 5 liters per hour at 210° F. for 16 hours, thereafter allowing the sample to cool to room temperature in 4 hours, and determining gravimetrically the amount of sludge deposit formed during the test. The appearance of stain on the walls of the glass equipment and the color of the oxidized sample are also noted. A more stable fuel oil will have less sludge deposit, lighter color, and less staining. The results of the test are indicated in Table III.

Table III

| Fuel Oil Composition Tested | Sludge, mg./100 ml. of Sample | ASTM color of Oxidized Sample | Stain |
|---|---|---|---|
| Fuel oil alone | 9.5 | 7 | Medium-heavy. |
| Fuel oil + 0.075% of the Product of Example 13 | 1.6 | 3 | Slight. |

The fuel oil compositions of this invention may also contain other additives such as ashless dispersants, metal-containing detergents, anti-foam agents, color-stabilizers, anti-freeze agents, pour point depressing agents, oxidation-inhibiting agents, corrosion-inhibiting agents, metal-deactivating agents, de-emulsifying agents, etc. Examples of detergents include barium mahogany sulfonate, barium salt of the phosphorus acid obtained by the reaction of a polyisobutene (molecular weight of 1000) with phosphorus pentasulfide, and calcium salt of didodecylbenzene sulfonate.

Anti-foam agents include polymeric alkyl siloxanes, poly(alkylmethacrylates), and the condensation product of alkylphenol with formaldehyde and an amine. Pour point depressing agents are illustrated by polymers of ethylene, propylene, or isobutene and poly(alkylmethacrylates). Corrosion- and oxidation-inhibiting agents include zinc di-octylphosphorodithioate, 4-methyl-2,6-di-tert-butylphenol, N,N'-sec-butyl phenylenediamine, etc. Still other additives are exemplified by tertiary-octylamine, mono-dodecyl ether of triethylene glycol, polyisobutene (molecular weight)-substituted succinamide of tetraethylene pentamine, copolymer of di-nonyl fumarate with vinyl acetate, the imine obtained by the reaction of salicyl aldehyde with propylene diamine, the condensation product of an alkylphenol with formaldehyde and propylene oxide, etc.

What is claimed is:

1. In the operation of a hydrocarbon fuel burner assembly equipped with a filter screen through which the fuel passes and in which the fuel is characterized by the presence therein of a small amount of a soap-like contaminant having a tendency to form deposits on said filter screen, the improvement comprising preventing the formation of said deposits which comprises incorporating in the fuel at least about 0.0001% by weight of a salt of (A) a basic amino reactant selected from the class consisting of (1) ammonia, (2) amines having up to about 30 carbon atoms and selected from the class consisting of alkylamines, arylamines, and heterocyclic amines, and (3) partially acylated polyamines obtained by the reaction at a temperature above about 100° C. of one mole of an alkylene polyamine having $n$ amino groups with up to $(n-1)$ equivalents of an aliphatic hydrocarbon carboxylic acid having at least about 12 carbon atoms with (B) at least about one equivalent, per equivalent of (A), of an acidic, phosphorus-containing reactant prepared by the process comprising the reaction of phosphorus pentoxide with from about 2 to about 4 moles of a hydroxy compound selected from the class consisting of olefin polymer-substituted phenols wherein the olefin polymer substituent has a molecular weight of at least about 250 and the condensation products of said phenols with an epoxide selected from the class consisting of hydrocarbon epoxides and polar-substituted hydrocarbon epoxides.

2. The improvement of claim 1 wherein the basic amino reactant of (A) is a partially acylated polyamine obtained by forming an intermediate by the reaction at a temperature above about 150° C. of a polyethylene polyamine having $n$ amino groups with from 1 to $(n-1)$ equivalents of an aliphatic hydrocarbon carboxylic acid having at least about 18 carbon atoms and treating said intermediate with up to about 5% of a lower alkylene epoxide.

3. The improvement of claim 1 wherein the acidic, phosphorus-containing reactant of (B) is prepared by the process comprising the reaction of phosphorus pentoxide with about 3 moles of the condensation product of an olefin polymer-substituted phenol with from about 1 to about 10 moles of an alkylene oxide wherein the olefin polymers substituent has a molecular weight of at least about 250.

4. The improvement of claim 1 wherein the salt is a salt of (A) ammonia with (B) about 1 equivalent, per equivalent of (A), of an acidic, phosphorus-containing reactant prepared by the process comprising the reaction at a temperature between about 50° C. and about 90° C. of phosphorus pentoxide with about 3 moles of a polyisobutene-substituted phenol wherein the polyisobutene substituent has a molecular weight of from about 250 to about 5000.

5. The improvement of claim 1 wherein the salt is a salt of (A) an alkyl primary amine having from 1 to about 30 carbon atoms with (B) about 1 equivalent, per equivalent of (A), of an acidic, phosphorus-containing reactant prepared by the process comprising the reaction at a temperature between about 50° C. and about 90° C. of phosphorus pentoxide with about 3 moles of a polyisobutene-substituted phenol wherein the polyisobutene substituent has a molecular weight of from about 250 to about 5000.

6. The improvement of claim 1 wherein the salt is a salt of (A) a partially acylated polyamine obtained by forming an intermediate by the reaction at a temperature between about 180° C. and about 300° C. a polyethylene polyamine having from 3 to 5 amino groups per molecule with from about 3 to 5 equivalents of an aliphatic hydrocarbon carboxylic acid having a molecular weight from about 200 to about 400 and treating said intermediate with about 5% of ethylene oxide at a temperature between about 150° C. and about 180° C. with (B) about 1 equivalent, per equivalent of (A), of an acidic, phosphorus-containing reactant prepared by the process comprising the reaction at a temperature between about 50° C. and about 90° C. of phosphorus pentoxide with about 3 moles of a polyisobutene-substituted phenol wherein the polyisobutene substituent has a molecular weight of from about 250 to 5000.

7. The improvement of claim 6 wherein the polyethylene polyamine in (A) is a mixture of diethylene triamine and triethylene tetramine.

8. The improvement of claim 6 wherein the aliphatic hydrocarbon carboxylic acid in (A) is a mixture of about equivalent amounts of a naphthenic acid having a molecular weight of about 300 and oleic acid.

9. The improvement of claim 6 wherein the polyisobutene substituent of the polyisobutene-substituted phenol in (B) has a molecular weight of about 350.

10. The improvement of claim 6 wherein the salt is formed by mixing the partially acylated polyamine reactant of (A) and the acidic, phosphorus-containing reactant of (B) at a temperature below about 100° C.

References Cited by the Examiner

UNITED STATES PATENTS

| | | | |
|---|---|---|---|
| 3,079,339 | 2/1963 | Cantrell et al. | 44—69 |
| 3,115,398 | 12/1963 | Thayer | 44—72 |

DANIEL E. WYMAN, *Primary Examiner.*

Y. M. HARRIS, *Assistant Examiner.*

UNITED STATES PATENT OFFICE
CERTIFICATE OF CORRECTION

Patent No. 3,273,980                            September 20, 1966

William M. Le Suer et al.

It is hereby certified that error appears in the above numbered patent requiring correction and that the said Letters Patent should read as corrected below.

Column 1, line 71, for "acrylated" read -- acylated --; column 2, line 12, for "folowing" read -- following --; line 44, for "ardical" read -- radical --; line 64, for "froms" read -- forms --; column 3, line 60, for "on an" read -- or an --; column 4, line 31, for "by the" read -- by treating the --; column 8, line 21, for "4 moles" read -- 2 moles --.

Signed and sealed this 15th day of October 1968.

(SEAL)
Attest:

Edward M. Fletcher, Jr.
Attesting Officer

EDWARD J. BRENNER
Commissioner of Patents